United States Patent Office.

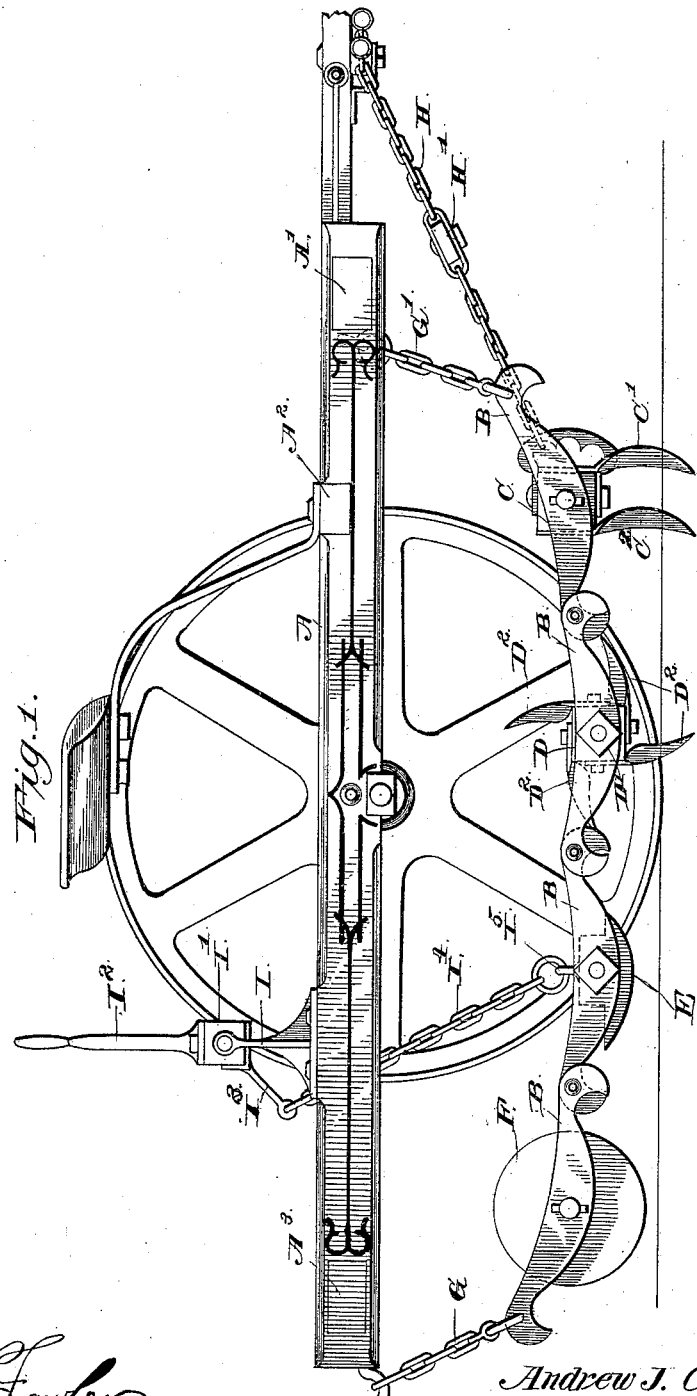

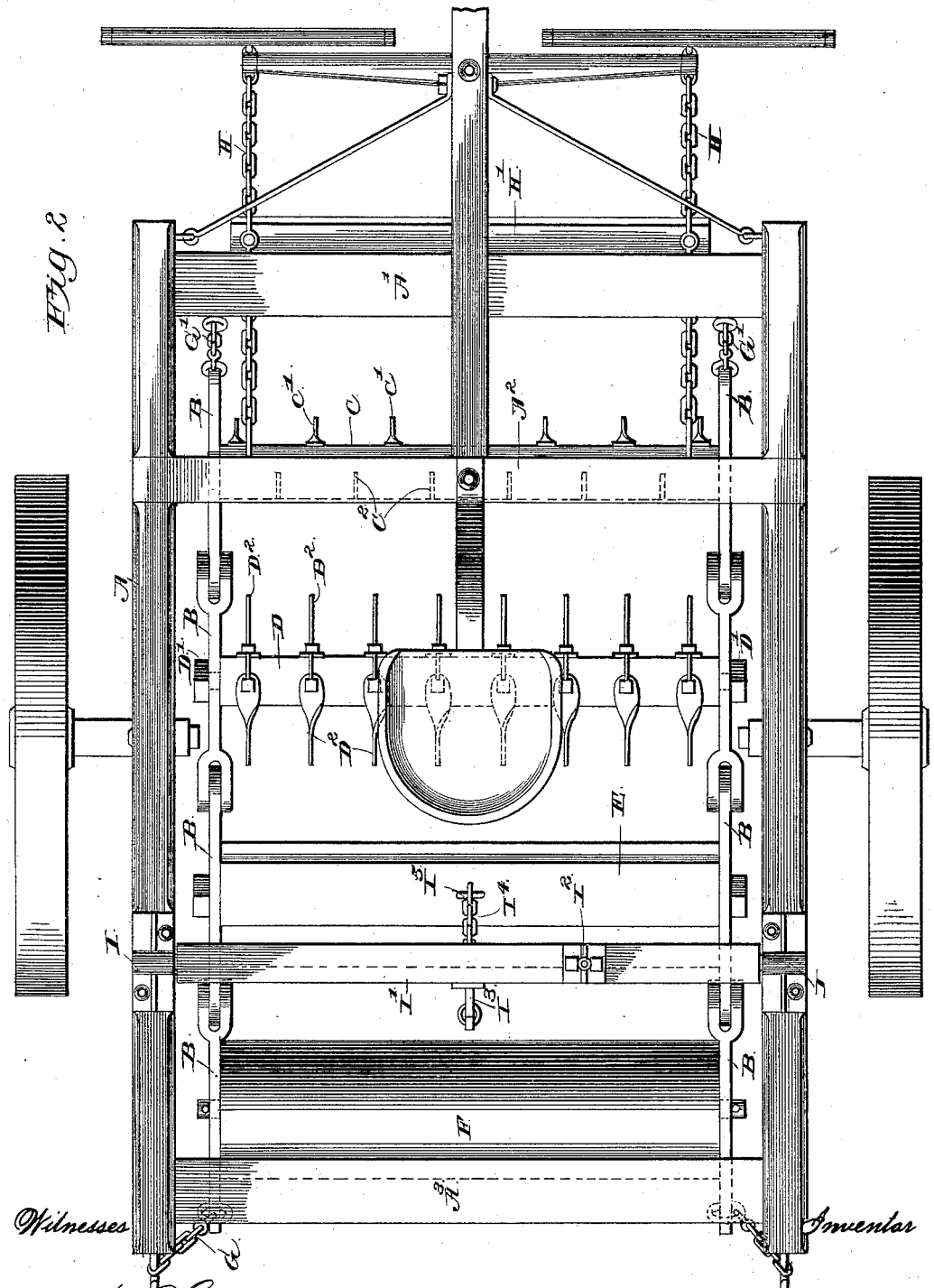

ANDREW JEFFERSON CASEY, OF LEWISBURG, ASSIGNOR OF ONE-HALF TO ANDREW J. CASEY, OF RUSSELLVILLE, KENTUCKY.

COMBINED CUTTER, PULVERIZER, DRAG, AND ROLLER.

SPECIFICATION forming part of Letters Patent No. 409,391, dated August 20, 1889.

Application filed April 29, 1889. Serial No. 309,001. (No model.)

*To all whom it may concern:*

Be it known that I, ANDREW JEFFERSON CASEY, a citizen of the United States, residing at Lewisburg, in the county of Logan and State of Kentucky, have invented a new and useful Combined Cutter, Pulverizer, Drag, and Roller, of which the following is a specification.

The object of my invention is the provision of a combined cutter, pulverizer, drag, and roller which shall be easily controlled from the seat, and also be capable of use as a cultivator, if desired.

To this end I construct my device as described in the following specification, and with the novel features set forth in the claims at the end of the same.

In the drawings, Figure 1 is a side elevation of my harrow. Fig. 2 is a top plan of the machine.

A is the main frame, which is preferably of the construction indicated in Fig. 1, being provided with two front beams A' and A² and a rear beam A³, as shown, and being mounted upon wheels. Hanging under the main frame is my flexible frame, formed of jointed links B, an equal number or these links being formed at each side of said frame. These links are preferably four in number, although idle links may be employed, if desired; and between each pair of links there is fastened a cross-piece, as shown in Fig. 2. The foremost of these cross-pieces is called the "cutter-beam," and is shown at C. It is provided with curved teeth projecting slightly forward and in the same direction, being parallel. These teeth are preferably made of spring-steel and formed as shown, the beam C being rigidly fastened at its ends to the links. Several of the middle teeth are made removable, for a purpose described hereinafter. These curved teeth are shown at C'. Fastened to the back of the beam C and slightly curved are the teeth C², set alternately with the forward teeth. These are in every respect similar to the forward teeth.

The second pair of links is shown provided with a rotating shaft D, journaled at about the middle of said links and fastened thereto by the exterior nuts D', in order that this roller or shaft may be removed at will. The shaft D is armed with backwardly-curved teeth or knives D², attached thereto as shown, made of spring-steel, preferably, and so set as to act as pulverizers. As the frame moves forward, this shaft turns in the direction of the wheels.

The third pair of links carry the rigidly-fastened drag E, which is shaped like an ordinary drag, being flat underneath or slightly convex.

The fourth pair of links support the roller proper, which, journaled between them, acts to finish the preparation of the ground begun just after plowing by the forward beam of my device. This roller F is an ordinary heavy roller, adapted to flatten and finally compress the earth. The rear ends of the row of links forming the side of the flexible chain are hung to the side beams of the frame A, as shown, by chains G. The fore ends are hung in a similar manner by chains G'.

In two-horse harrows the main cross-tree is suspended beneath the pole or draft-bar, and to or near the ends thereof are attached the whiffletree, as shown. Just back of these whiffletrees, to the ends of the cross-tree, are fastened pulling-chains H, whereby the strain from the horses is directed immediately to the flexible frame as well as the main frame. There is a spacing-bar H' preferably fixed between these chains, as shown. The principal object of these pulling-chains is the equalizing of the strain for the two horses at all times.

The seat may be affixed to the main frame in any suitable manner; but it is preferred to accomplish this as shown in Fig. 1, bringing the seat back over the center of the harrow and within easy reach of the lifting-handle.

Fixed to the two side beams of the main frame are brackets I, between which the lifting-shaft I' is journaled. A jointed or straight lever I² is fixed to this shaft and projects within easy reach of the hand of the driver. A second bar or lever I³ is also fixed to said shaft, and there depends therefrom the system of links I⁴, which terminates in an appropriate fastening I⁵ to one of the cross-beams of the flexible frame, preferably the drag E, as shown. The arrangement of these parts is such, as shown in Fig. 1; that when the lever $I^2$ is drawn forward the lever $I^3$ is raised and thus the flexible frame lifted off of the ground. By means of this device the rear portion of the flexible frame may be so manipulated as to vary the degree of dragging and rolling at will. Thus, for instance, in broad-cast sowing, where there is no hilling to be done, the roller may be left partly raised or entirely taken up, leaving the ground open for the reception of the seed, the whole being finally rolled after sowing. Where the sowing is to be done in rows or hills, however, the roller will be left with its full weight upon the ground.

Where it is desired to use my device as a cultivator, several teeth are removed from the beam C to allow of the passage of the young corn while the remaining teeth on either side stir between the rows. The remainder of the flexible frame is held permanently off of the ground, the roller D being removed.

I do not wish to be understood as limiting myself to the exact construction shown, as various details may be modified without departing from the spirit of my invention.

What I claim is—

1. A main frame mounted on wheels, in combination with a flexible frame composed of jointed links hung to said main frame, and a harrow beam and roller fastened between said links, substantially as described.

2. A main frame mounted on wheels, in combination with a flexible frame hung to said main frame, a harrow beam and roller fastened in said flexible frame, and means, substantially as described, for lifting said flexible frame.

3. A main frame mounted on wheels and a flexible frame hung beneath the same, in combination with a harrow beam and roller fastened in said flexible frame, brackets on said main frame, a shaft journaled between said rollers, two levers fastened to said shaft, and a connection between one of said levers and the flexible frame, substantially as described.

4. A main frame mounted on wheels, a flexible frame hung beneath the same, and whiffletrees fastened to said main frame and directly connected with said flexible frame, in combination with a harrow beam and roller fastened in said flexible frame, and means, substantially as described, for raising the same.

5. A main frame mounted on wheels, in combination with a flexible frame hung beneath the same, a toothed cutter fixed in said under frame, a toothed pulverizer behind the cutter rotating therein, and a roller behind the pulverizer, also rotating therein, substantially as described.

6. A main frame on wheels, in combination with a flexible frame hung beneath the same, a toothed cutter fixed in said under frame, a toothed pulverizer behind said cutter, rotating therein, a drag fixed therein behind said pulverizer and a roller rotating therein behind said drag, substantially as described.

7. A main frame on wheels and a flexible frame hung beneath the same, in combination with a toothed cutter fixed within the latter frame and having a number of middle teeth removable therefrom, substantially as described.

8. A main frame on wheels and a flexible frame hung beneath the same, in combination with a toothed cutter fixed within the latter frame and having a number of middle teeth removable therefrom, and a removable revolving pulverizer journaled back of said cutter within said frame, substantially as specified.

In testimony that I claim the foregoing as my own I have hereto affixed my signature in presence of two witnesses.

ANDREW JEFFERSON CASEY.

Witnesses:
DAN. C. CALDWELL,
F. T. SMALL.